United States Patent [19]

Bessette

[11] 4,180,157
[45] Dec. 25, 1979

[54] APPARATUS FOR HANDLING MANURE

[76] Inventor: Georges H. Bessette, 185, 15e' Ave., Iberville, Quebec, Canada

[21] Appl. No.: 891,841

[22] Filed: Mar. 30, 1978

[30] Foreign Application Priority Data

Feb. 22, 1978 [CA] Canada .................................. 297538

[51] Int. Cl.² ...................... B65G 25/04; F04B 21/04
[52] U.S. Cl. ................................... 198/747; 417/551; 417/900
[58] Field of Search ............... 198/540, 550, 562, 563, 198/616, 736, 747; 417/551, 900

[56] References Cited

U.S. PATENT DOCUMENTS

| 346,720 | 8/1886 | Carlson ................................. 417/551 |
| 1,576,606 | 3/1926 | Haskell ................................. 417/551 |
| 2,238,944 | 4/1941 | Muller et al. ......................... 417/551 |
| 3,687,311 | 8/1972 | Nesseth ................................. 198/736 |
| 3,876,341 | 4/1975 | Nesseth ................................. 417/900 |
| 3,981,635 | 9/1976 | Hedlund ............................... 417/900 |
| 3,995,734 | 12/1976 | Berg .................................... 198/747 |

Primary Examiner—Joseph E. Valenza
Attorney, Agent, or Firm—Schwartz, Jeffery, Schwaab, Mack, Blumenthal & Koch

[57] ABSTRACT

An improved manure handling apparatus of the flow-through piston or plunger type. The apparatus has a passageway, vertically mounted in the floor of a barn with a plunger slidably mounted within the passageway. The plunger has a pair of swinging doors for opening or closing the passageway. First means move the plunger up and down within the passageway to push manure therethrough. Second means move the doors open or closed depending on the direction the plunger is moved.

8 Claims, 5 Drawing Figures

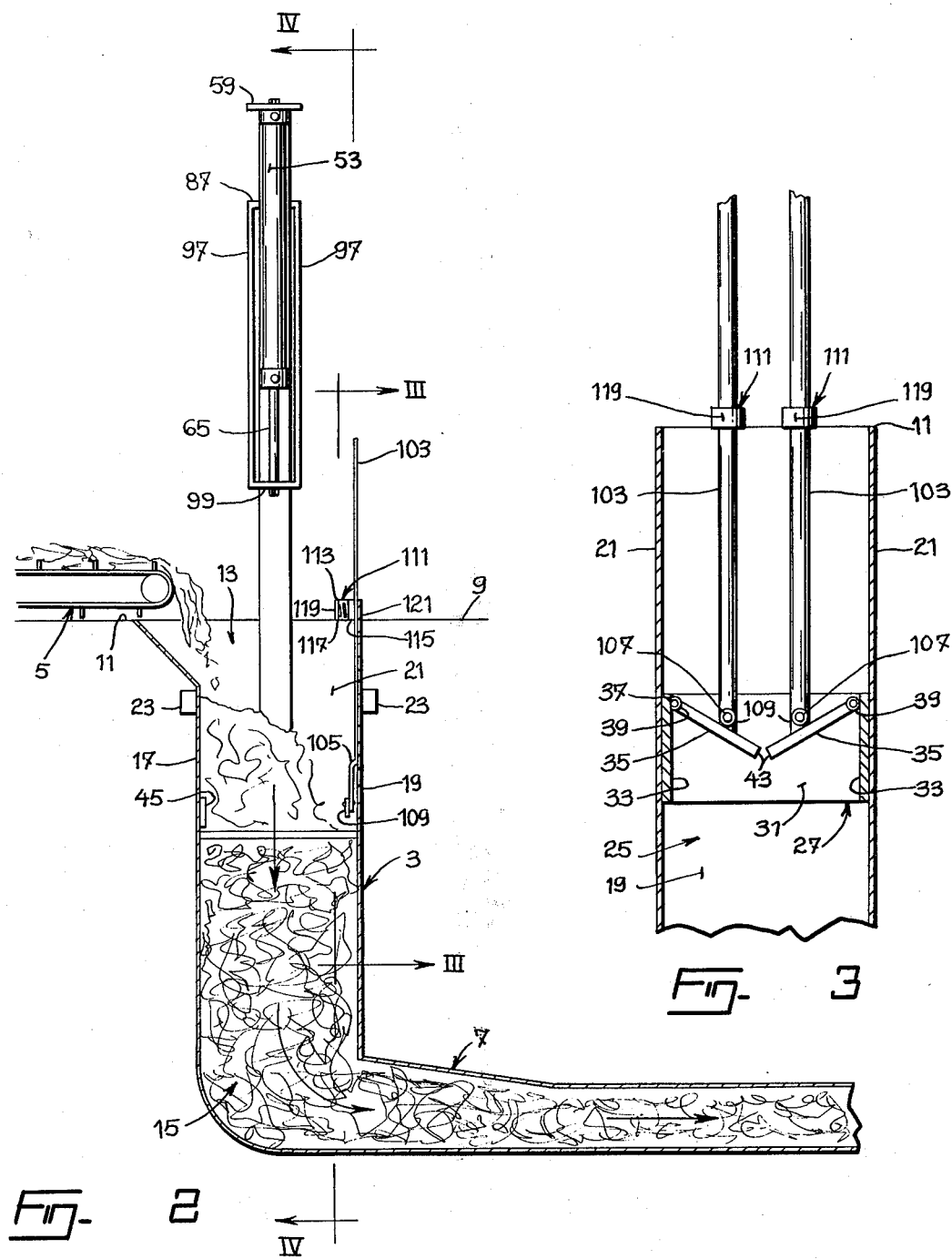

APPARATUS FOR HANDLING MANURE

The present invention relates to an apparatus for handling manure.

The invention more particularly relates to an improved manure handling apparatus of the type employing a flow-through piston or plunger.

Usually, manure is collected within a barn, conveyed out from the barn, and deposited on top of a manure pile near the barn. This collection system has several disadvantages however. Manure collected in this manner is not ready for spreading since fresh manure is always deposited on top of the pile. Also, the fresh manure is subject to run-off particularly in the spring, which could create pollution problems. In addition, the manure is difficult to handle in the winter on the outside conveying apparatus, frequently freezing thereto.

In order to overcome the above, and other disadvantages, manure handling systems have been deviced to collect manure within the barn and to then transport it through an underground conduit to a manure storage area near the barn, delivering the manure to the central interior of the stored manure. U.S. Pat. Nos. 3,687,311; 3,981,635 and 3,995,734 are typical of such systems which all employ a collecting pit and piston or plunger means to push the manure from the pit through the conduit to the storage area. These known systems have their own drawbacks however. Some must operate with a slanted-floor pit and an inclined piston or plunger. These systems thus require a good deal of space within the barn, which space is not always readily available without additional expense. Also, some of the systems are susceptible to jamming when the manure is fed into the pit below the piston (as in U.S. Pat. No. 3,995,734). If the manure jams in the neck of the device and additional manure is fed on top, the plunger or ram may be damaged trying to push the piled and jammed manure into and through the conduit.

To avoid jamming in systems of this type, water must be frequently added to the manure. Use can also be made of specific pass-through piston or plunger devices which minimize manure jamming. These devices employ a swinging door or doors which are indirectly actuated by the movement of the plunger. However, because the doors are indirectly actuated they may also jam during operation of the system (U.S. Pat. Nos. 3,687,311 and 3,981,635). If the doors are designed in an attempt to minimize jamming (U.S. Pat. No. 3,981,635), then the capacity of the piston or plunger to pass material may be reduced.

The present invention proposes a manure handling apparatus of the pass-through piston or plunger type, which apparatus is quite improved as compared to the known apparatus of this type.

The apparatus according to the present invention is compact and thus requires a minimum amount of floor area for installation in a barn compared to the installation area required by known devices.

Further, and more importantly, the apparatus according the present invention operates vertically thereby further reducing the floor space required.

The apparatus according to the present invention also minimizes jamming in employing a flow-through plunger having a directly, or positively, actuated swinging door or doors.

In accordance with the present invention, there is provided a manure handling apparatus having a passageway for receiving the manure through one inlet end thereof, and plunger means slidably mounted in the passageway for pushing manure through the passageway in a direction from the one inlet end toward the other end. The plunger means comprises a pair of swinging doors which are movable between a first position where they close the passageway and a second position where they open the passageway. First moving means are connected to the plunger means for moving the same in the passageway toward and away from the one inlet end. Second moving means are connected to the pair of swinging doors of the plunger means for moving the doors to the first closed position when the plunger means moves away from the one inlet end and for moving the doors to the second opened position when the plunger moves toward the one inlet end.

In accordance with a preferred embodiment of the invention, the one inlet end of the passageway through which the manure is received, is transverse to the passageway. In accordance with another preferred embodiment of the invention, the first and second moving means extend parallel to the passageway and are transverse to the one inlet end of the passageway.

The invention will now be described in detail with reference to the accompanying drawings in which:

FIG. 2 is a section view of the apparatus;

FIG. 3 is a section view taken along line III—III of FIG. 2;

Figure 1:
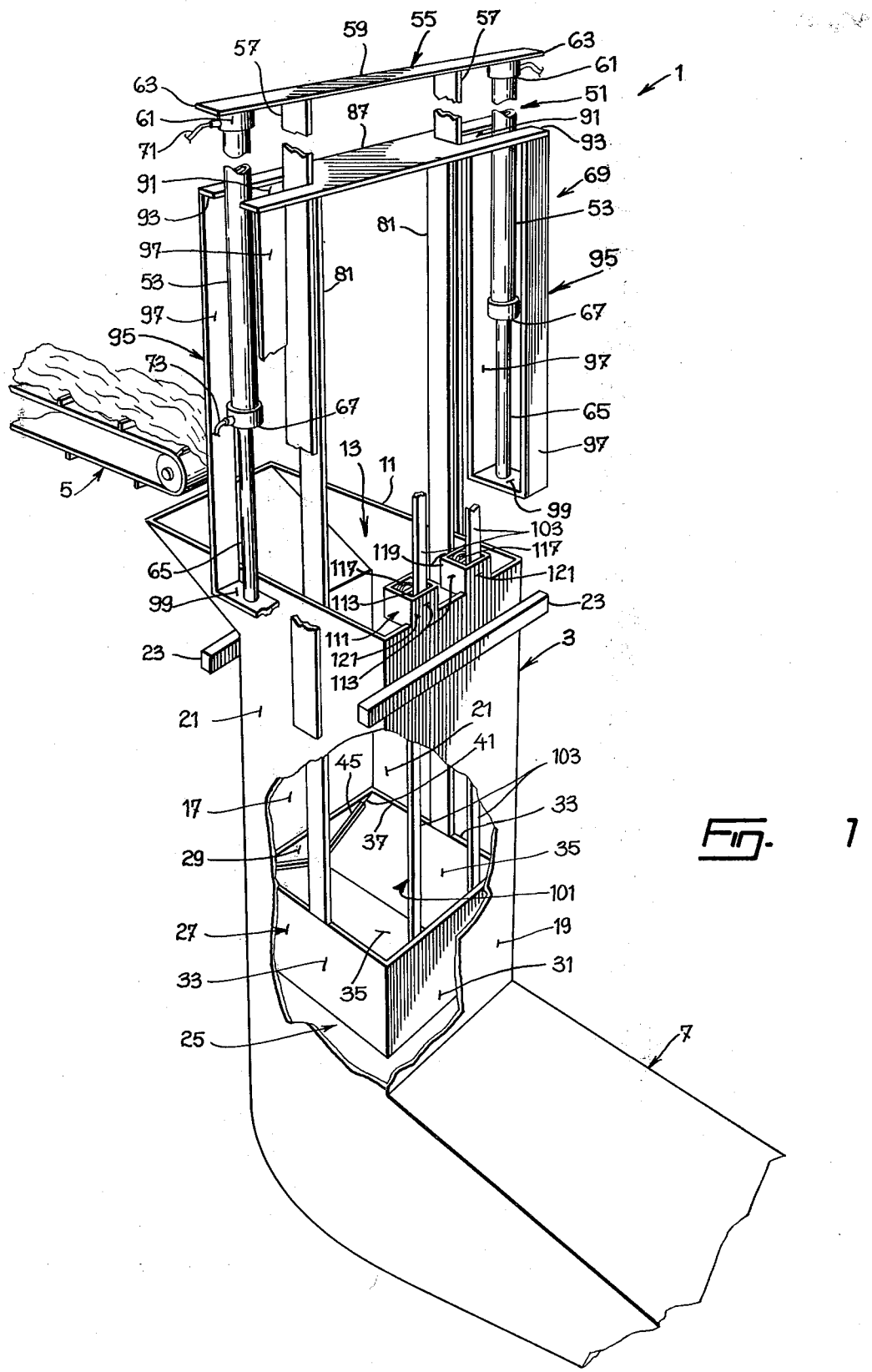
FIG. 1 is a perspective view of an manure handling apparatus according to the invention, partially broken away to show details thereof.

The manure handling apparatus 1, as shown in FIGS. 1 and 2, has a tubular passageway 3 for passing manure from a conveyor 5 to an underground conduit 7 which directs the manure to a storage area (not shown) outside a barn. The conveyor 5 is on the floor 9 of the barn and collects and conveys the manure in the barn to the manure handling apparatus 1. The passageway 3 of the handling apparatus 1 preferably is upright with its top edge 11 substantially level with the floor 9 of the barn. The top edge 11 defines an inlet end 13 for receiving the manure which end preferably is enlarged to extend just beneath the conveyor 5 to collect the manure delivered off the conveyor. This inlet end 13 is generally transverse to passageway 3. The bottom outlet end 15 of passageway 3 is connected to the underground conduit 7. The passageway 3 preferably is rectangular in cross-section, having a front wall 17, a back wall 19, and sidewalls 21. Suitable framing and/or fastening means 23 can be provided for mounting the passageway perpendicularly with respect to the barn floor 9.

Figure 4:
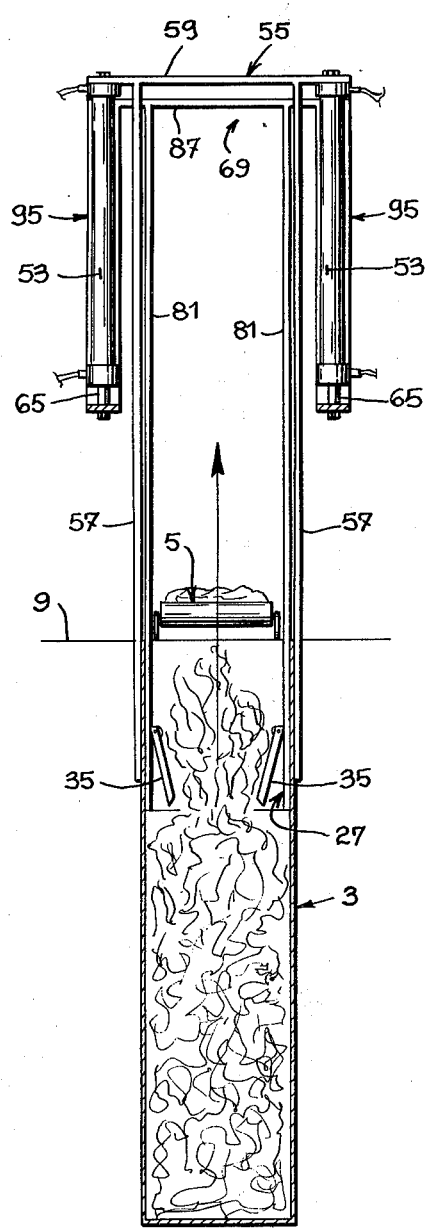
FIG. 4 is a section view of the apparatus taken along line IV—IV of FIG. 2 at the completion of the upstroke of the plunger.

A plunger 25 is slidably mounted within passageway 3 for pushing manure therethrough. The plunger 25 has a door frame 27 comprising a front wall 29, a back wall 31, and sidewalls 33. The door frame 27 fits snugly within passageway 3 with its walls flush against the walls of the passageway. The plunger 25 includes means for opening and closing the passageway. These opening and closing means can comprise one, and preferably a pair of doors 35 pivotably mounted on the door frame 27. Each door 35 is rectangular in shape and is mounted, along one side edge 37, by a hinge 39 as shown in FIG. 3, to the adjacent sidewall 33 of the door frame 27. The end edges 41 of each door, shown in FIG. 1, are adjacent the front and back walls 29, 31 of door frame 27. The doors 35 are movable between a first position where they abut along their other side edges 43, and a second position where they hang suspended from their hinges 39, lying adjacent the respective sidewalls 33 of frame 27 as shown in FIG. 4. In the first position, the doors 35 close passageway 3; and in the second position, open the passageway 3. In the first, closed position the doors 35 are slightly downwardly inclined as shown in FIG. 3. Inclined stop members 45, fixed to the front wall 29 of frame 27, limit the movement of the doors 35 as they are moved to the first closed position from the second open position, as will be described.

First moving means 51 are provided to move the plunger 25 up and down within passageway 3. The moving means 51 can comprise a pair of hydraulic cylinders 53, one on each side of passageway 3 and mounted thereabove by a mounting frame 55. The mounting frame 55 can comprise a pair of upright support members 57, each attached at its lower end, by welding or other suitable means, to the top, outside surface of a passageway side-wall 21. The support members 57 are substantially parallel to, and centrally located, relative to the major portion of the side-wall 21. The top ends of members 57 are joined by a horizontal top brace 59 which projects past the members 57, to either side of passageway 3.

One cylinder 53 is fixed, at its upper end 61 to each end portion 63 of brace 59 and extends downwardly therefrom, substantially parallel to adjacent member 57. The piston rod 65, projecting from the bottom end 67 of cylinder 53, is fixed to a plunger support frame 69. Hydraulic lines 71, 73 lead to the top and bottom ends 61, 67 respectively of cylinders 53.

The plunger support frame 69 has a pair of support arms 81, fixed by welding or other suitable means at their lower ends to the top of the sidewalls 33 of door frame 27, about midway between the front and back walls 29, 31 of frame 27. The support arms 81 lie inside, and adjacent to, the support members 57 of mounting frame 55. The upper ends of arms 81 are joined by a horizontal cross piece 87 located beneath and substantially parallel to top brace 59 of mounting frame 55. The cross piece 87 projects past arms 81 and its projecting end portions have longitudinal notches 91 extending in from its end edges 93 through which support members 57 and cylinders 53 pass. A U-shaped hanger 95 is suspended from each end portion of crosspiece 87. Each hanger 95 comprises a pair of vertical braces 97 and a bottom horizontal brace 99 joining the bottom ends of vertical braces 97 together. The piston rod 65 of cylinder 53, within each hanger 95, is fixed to horizontal brace 99.

Second moving means 101 are provided for moving the doors 35 between the open position and the closed position. The second moving means 101 can comprise a pair of vertical struts 103 lying adjacent the inside surface of the back wall 19 of passageway 3 and projecting up therefrom. The bottom portion of each strut 103 is offset at 105, as shown in FIG. 2 to lie adjacent the inside surface of the back wall 31 of door frame 27. The bottom end of each strut 103 is pivotably connected by a pin 107 to a support 109 fixed to the top surface of a door 35. The support 109 preferably is closer to side edge 43 of the door than to side edge 37. Each strut 103 passes vertically through a friction collar 111 fixed to or near the top of back wall 19 of passageway 3. The friction collars 111 each comprise a square tubular housing 113, a pad 115 within the housing, and a spring 117 between pad 115 and one wall 119 of housing 113, biasing pad 115 toward the wall 121 opposite wall 119. The strut 103 passes between pad 115 and wall 121.

Figure 5:
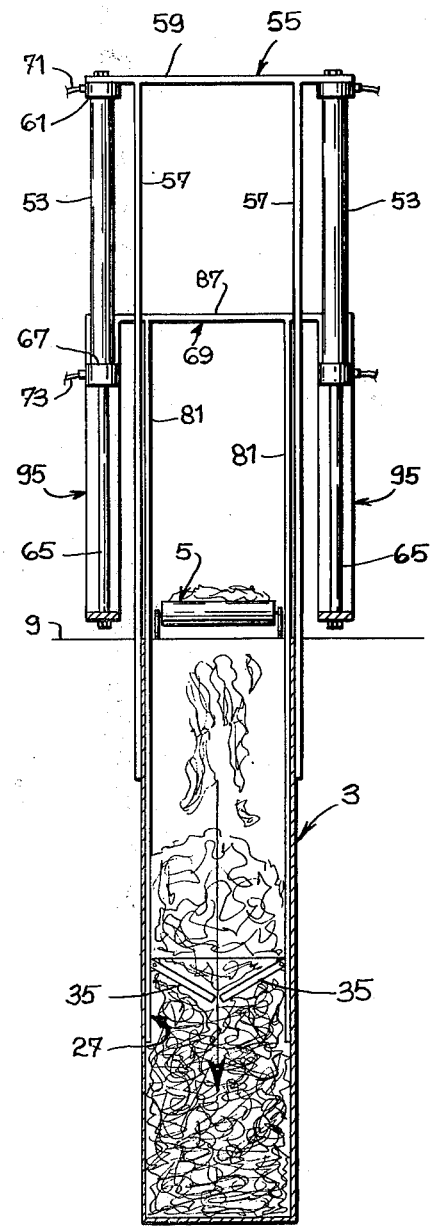
FIG. 5 is a section view similar to FIG. 4 but at the completion of the downstroke of the plunger.

In operation, the plunger 25 is normally in a lowered position within the passageway 3, with the doors 35 closed, as shown in FIGS. 1 or 5. In this position, cylinders 53 have piston rods 65 extended downwardly with plunger support frame 69 lowered with respect to mounting frame 55. Conveyor 5 carries manure to the inlet end 13 of passageway 3 where it drops down into the passageway on top of closed doors 35. The springs 117 in friction collars 111 have sufficient strength to frictionally hold struts 103 and thus keep doors 35 closed as a load of manure builds up on top of the doors. When a sufficient load of manure has built up on the doors 35, the plunger 25 is raised by actuating hydraulic cylinders 53, to lift support frame 69 relative to mounting frame 55. When the plunger bein gs its initial upward movement, struts 103 are still held in place by friction collars 111. The initial upward movement of plunger 25 thus raises edges 37 of doors 35 about pins 107 and at the same time the lower ends of struts 103 pivot slightly about friction collars 111 toward the side walls 21 of passageway 3 causing the doors to swing open. As plunger 25 continues its upward movement, as shown in FIG. 4, the force provided by the hydraulic cylinders 53 overcomes the force of the springs in the friction collars, and struts 103 slide up through the collars. The plunger is lifted with the doors 35 open and the manure that was on top of the plunger is passed through the plunger as it rises.

At the completion of the upward stroke of the plunger, the cylinders 53 are actuated to mobe the plunger down. During initial downward plunger movement, the friction collars again hold struts 103 in place, causing doors 35 to pivot about the downwardly moving hinges 39 to a closed position abutting stops 45. When the doors abut stops 45, the force of cylinders 53 overcomes the force of the springs in the collars, sliding struts 103 through the collars. The doors 35, held by stops 45, press down against the manure in passageway 3, as shown in FIG. 5, pushing it down into and through conduit 7. When the cylinders reach the end of their downward stroke, the plunger sits in its lowered position, with the doors closed, and held closed by friction collars 111, ready to receive more manure from conveyor 5.

While the first moving means 51 employ hydraulic cylinders 53, other power devices can be used such as pneumatic motors or electric motors.

As previously indicated, a single door rather than a pair of doors, could be used in plunger 27. The single door would operate the same as one of the two doors described, but abutting against the sidewall 33 of frame 27, opposite sidewall 33 that it would be hinged to, when in the closed position.

I claim

1. Apparatus for handling manure, comprising:
    a passageway for receiving the manure through on inlet end;
    plunger means slidable in the passageway for pushing manure through the passageway in a direction from the one inlet end toward the other end, said plunger means comprising a pair of swinging doors movable between a first position were they close the passageway and a second position where they open the passageway;

first moving means connected to the plunger means for moving the same in the passageway toward and away from the one inlet end; and second moving means connected to the pair of swinging doors of the plunger means for moving the door to the first closed position when the plunger means moves away from the one inlet end, and for moving the doors to the second position when the plunger moves toward the one inlet end.

2. Apparatus as claimed in claim 1, wherein the one inlet end is transverse to the passageway.

3. Apparatus as claimed in claim 2, wherein the first and second moving means are generally parallel to the passageway and generally transverse to the passageway.

4. Apparatus as claimed in claim 1, further comprising stop means on said plunger means for stopping the pair of swinging doors in the closed position when moved to the closed position.

5. Apparatus as claimed in claim 1, wherein said first moving means is mounted on a mounting frame fixed to the passageway, and connected to the plunger means by a plunger support frame, fixed to the plunger means.

6. Apparatus as claimed in claim 1, wherein said second moving means comprise at least one strut pivotably connected to the pair of swinging doors, said strut passing through friction means fixed to the passageway.

7. Apparatus as claimed in claim 7, wherein said friction means is fixed to the passageway near to the one inlet end.

8. Apparatus as claimed in claim 7, wherein said friction means comprises a tubular collar fixed to the passageway, said strut being passed through the collar, a pad within the collar, and spring means within the collar biasing the pad against the strut in a direction generally perpendicular to the strut.

* * * * *